United States Patent
Mugunda et al.

(10) Patent No.: US 12,366,903 B2
(45) Date of Patent: Jul. 22, 2025

(54) SYSTEM AND METHOD OF PROTECTING WORKLOADS FOR GPU COMPLEX SERVERS WITH LIQUID ASSISTED AIR COOLING

(71) Applicant: Dell Products L.P., Round Rock, TX (US)

(72) Inventors: Chandrasekhar Mugunda, Austin, TX (US); Rui An, Austin, TX (US); Hsien-Tsung Lin, Taoyuan (TW); Syamu Sajja, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 18/176,592

(22) Filed: Mar. 1, 2023

(65) Prior Publication Data
US 2024/0295909 A1   Sep. 5, 2024

(51) Int. Cl.
*G06F 1/20* (2006.01)
*G05B 19/416* (2006.01)

(52) U.S. Cl.
CPC .............. *G06F 1/20* (2013.01); *G05B 19/416* (2013.01); *G05B 2219/49216* (2013.01)

(58) Field of Classification Search
CPC .................................. G06F 1/20; G05B 19/416
See application file for complete search history.

(56) References Cited

U.S. PATENT DOCUMENTS

| | | | | |
|---|---|---|---|---|
| 2006/0253633 | A1* | 11/2006 | Brundridge | G06F 13/409 710/104 |
| 2012/0284211 | A1* | 11/2012 | Datta | G06F 11/0751 706/54 |
| 2015/0370294 | A1* | 12/2015 | Busch | G06F 1/206 713/320 |
| 2016/0034331 | A1* | 2/2016 | Na | G06F 11/0727 714/54 |
| 2019/0017513 | A1* | 1/2019 | Hillerup Lyhne | F04D 15/029 |

* cited by examiner

*Primary Examiner* — Mark A Connolly
(74) *Attorney, Agent, or Firm* — WOMBLE BOND DICKINSON (US) LLP (57) ABSTRACT

Methods, systems, and devices for providing computer-implemented services are disclosed. To provide the computer-implemented services, graphics processing units cooled using liquid assisted air cooling may be utilized. In the event of failure of liquid assisted air cooling, the extent of the failure may be identified. A response based on the extent of the failure may be implemented to reduce an impact on workloads performed by the graphics processing units. By customizing the response, the workloads may be preserved even when cooling for some of the graphics processing units is unavailable.

20 Claims, 8 Drawing Sheets

SYSTEM AND METHOD OF PROTECTING WORKLOADS FOR GPU COMPLEX SERVERS WITH LIQUID ASSISTED AIR COOLING

FIELD

Embodiments disclosed herein relate generally to device management. More particularly, embodiments disclosed herein relate to systems and methods to initiate an automatic failure response in data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing a data processing system. The data processing system may provide computer-implemented services. To provide the computer-implemented services, the data processing system may need to operate in operable conditions. These operable conditions may be predetermined operating conditions in which the data processing system generally operates optimally.

To place the data processing system in the operable conditions, the data processing system may include, and/or accommodate the installation of, a liquid assisted air cooling (LAAC) system. The LAAC system may place the data processing system in the operable conditions by providing a means for regulating heat that is generated by hardware components of the data processing system.

Heat may be generated by the hardware components while the hardware components process workloads that permit the data processing system to provide the computer-implemented services. Failure of at least a portion of the LAAC system may cause damage to the hardware components if the heat generated by the hardware components builds up. Consequently, damage to the hardware components may cause workloads performed by the hardware components to be lost (referred to as "workload loss"), which in turn may delay the data processing system from providing the computer-implemented resources.

To reduce the likelihood of workload loss during failure of at least a portion of the LAAC system, the data processing system may include a management controller to manage operations of the data processing system. The management controller may provide known good configuration data to pumps of the LAAC system to configure the pumps, the known good configurations data specifying operating conditions that may place the data processing system in the operable conditions. The management controller may obtain actual operating conditions of the pumps and implement an automatic failure response to preserve the workloads of the hardware components when the actual operating conditions do not place the data processing system in the operable conditions. By doing so, embodiments disclosed herein may reduce the likelihood of workload loss by managing operations of data processing systems.

In an embodiment, a data processing system for providing computer-implemented services using, at least in part, a graphics processing unit complex comprising graphics processors and pumps used to thermally manage the graphics processors is provided. The data processing system may include a processor; a management controller that is programmed to make a first determination regarding whether actual operating conditions for the graphics processing unit complex are within a range of known good configuration data, the actual operation conditions being based on operation of the pumps; in an instance of the first determination where the actual operating conditions are not within the range: obtain a failure pattern based on the actual operating conditions; make a second determination regarding whether the failure pattern matches a known failure pattern; in an instance of the second determination where the failure pattern matches the known failure pattern: obtain a type of failure for the known failure pattern; make a third determination regarding whether the type of failure matches a known failure type; in an instance of the third determination where the failure type matches the known failure type: obtain a failure response corresponding to the known failure type; and performing a remediation for the graphics processing unit complex using the failure response.

The operation of the pumps may be based, at least in part, on at least one selected from a group consisting of: flow rates of cooling fluid through the pumps; temperatures of the pumps; pressure of the cooling fluid through the pumps; and leaking of the cooling fluid from the graphics processing unit complex.

The known good configuration data may define a range of operating conditions that are likely to result in successful operation of the graphics processing unit complex.

The known failure pattern may indicate: a failure of a first pump of the pumps that is a member of a first redundancy group and continued operation of a second pump of the pumps that is a member of the first redundancy group.

The known failure pattern may indicate: a failure of all of the pumps that are members of a second redundancy group.

The first redundancy group may comprise any number of the pumps, all of any number of pumps being in serial fluid communication with one another, and the any number of pumps forming a cooling loop in line with a thermal dissipation element.

Performing the remediation for the graphics processing unit complex using the failure response comprises: migrating a workload hosted by a first graphics processing unit of the graphics processing unit complex to a different graphics processing unit.

Performing the remediation for the graphics processing unit complex using the failure response further comprises: backing up a workload hosted by a first graphics processing unit of the graphics processing unit complex to a different graphics processing unit.

Performing the remediation for the graphics processing unit complex using the failure response further comprises: notifying a user of the data processing system that a workload hosted by a graphics processing unit of the graphics processing unit complex is at higher risk of completion failure.

Performing the remediation for the graphics processing unit complex using the failure response further comprises: modifying a pumping rate of cooling fluid by the graphics processing unit.

In an aspect, a method for obtaining an automatic failure response is provided.

In an aspect, a data processing system is provided, as discussed above.

Figure 1A:
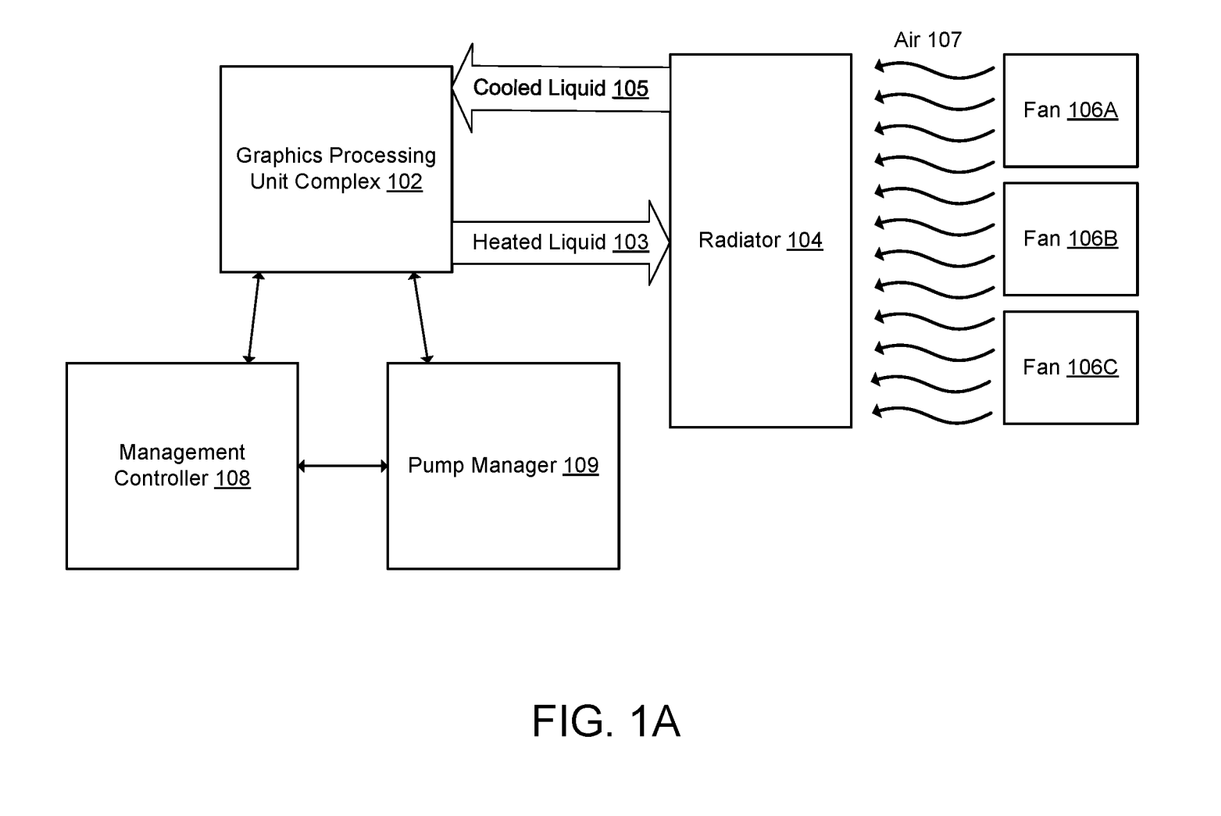
FIG. 1A shows a block diagram illustrating a system in accordance with an embodiment.

Turning to FIG. 1A, a block diagram illustrating a system in accordance with an embodiment is shown. The system shown in FIG. 1A may provide computer-implemented services. To provide the computer-implemented services, the system may include any number of data processing systems (e.g., graphics processing unit complex 102) with any number of hardware components (e.g., graphics processing units and/or other processors).

During operation of the data processing systems, the hardware components of the data processing systems may be assigned workloads to perform the computer-implemented services.

For example, graphics processing unit (GPU) complex 102 may obtain instructions from a user of GPU complex 102 (e.g., a different data processing system in communication with GPU complex 102). Each GPU (each hardware component) of GPU complex 102 may be assigned workloads to process in order for GPU complex 102 to execute the instructions.

Consequently, the hardware components (e.g., the GPUs and/or other processors) of the data processing systems may generate heat while processing the workloads. This heat, if left unregulated, may cause damage to the data processing systems and/or components thereof (e.g., the hardware components).

To manage the regulation of heat, a Liquid Assisted Air Cooling (LAAC) system (not explicitly shown in FIG. 1A) may be installed into GPU complex 102 to regulate the heat within the system. When installed, pumps of the LAAC system may be positioned with the hardware components (discussed further with respect to FIGS. 1B) to circulate cooling liquid used to extract heat from the hardware components. During processing of the workloads, each pump of the pumps may facilitate the transfer of heat away from corresponding hardware components of the hardware components using the cooling liquid. The pumps may allow the cooling liquid to carry the heat (becoming heated liquid 103) before pushing the cooling liquid through tubes that lead to radiator 104. Radiator 104 may allow for fans 106A-106C to blow air 107 onto radiator 104, cooling heated liquid 103, and allowing the cooling liquid to return to the pumps as cooled liquid 105.

Overtime, the LAAC system may experience a failure. For example, a pump of the pumps may (i) have a leak, (ii) receive heat damage, (iii) lose communication with the rest of the LAAC system, and/or (iv) other events that compromise the functionality of the pumps may occur.

Such failure of the LAAC system may lead to workload loss. Workload loss may occur due to (i) damage to the hardware components, (ii) automatic shutdown of one or more of the hardware components in an effort to save the hardware components from the damage, and/or (iii) any other compromise to the functionality of the hardware components. Consequently, workload loss may lead to GPU complex 102 being delayed in providing the computer-implemented services.

In general, embodiment disclosed herein relate to system, methods, and devices for reducing the impact of partial LAAC system failures. The failures may be managed by (i) identifying types of failures of LAAC systems and (ii) performing management responses customized to the different types of the failures.

To manage LAAC systems, the systems may include management controller 108. Management controller 108 may, responsive to different types of failures of the LAAC systems, instruct the pumps to perform in a manner designed to retain operable conditions (to implement known good configuration data for the pumps). To do so, management controller 108 may be operably connected to pump manager 109.

Management controller 108 may be operably connected to GPU complex 102 by being positioned on a circuit card (e.g., a motherboard) of the GPU complex 102 and/or a different data processing system operably connected to GPU complex 102 (not explicitly shown in FIG. 1A). Management controller 102 may include its own processor, memory, network connection, and access to a system bus.

Management controller 108 may further manage the system by initiating an automatic failure responses when the actual operating conditions of the pumps are outside a range of the operable conditions specified by the known good configuration data. This automatic failure response (to be discussed with respect to FIG. 3) may cause an execution of operations to preserve (when possible while retaining health of the GPUs) the workloads imperiled by the failure of the LAAC system.

Pump manager 109 may be implemented using a complex programmable logic device (CPLD). Pump Manager 109 may be adapted to directly communicate with the pumps of the LAAC system, relaying instructions from management controller 108, and interpreting data from the pumps to transmit to management controller 108. Similarly to management controller 108, pump manager 109 may be operably connected to GPU complex 102 by being positioned on the circuit card (e.g., the motherboard) of the GPU complex 102 and/or the different data processing system.

Figure 3A:
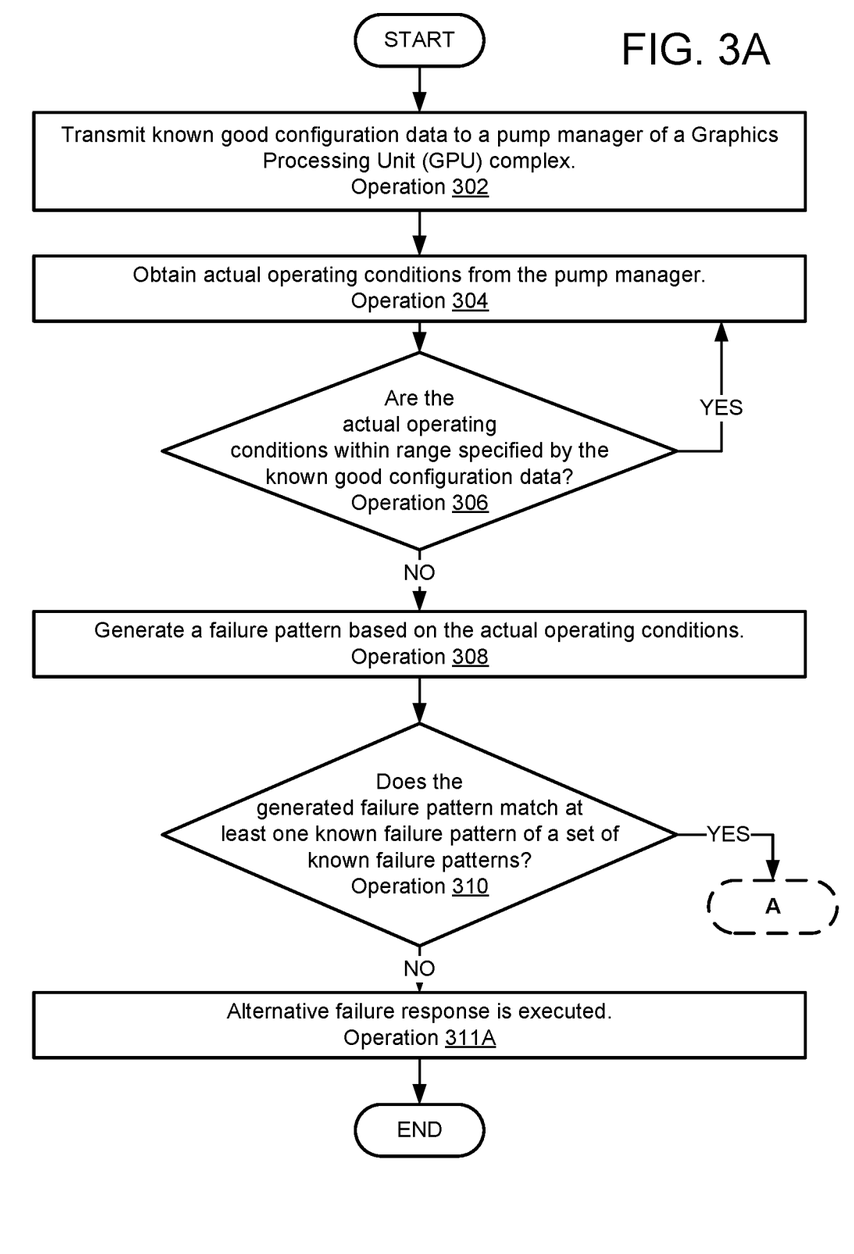
FIGS. 3A-3B show a flow diagram illustrating a method for managing a data processing system in accordance with an embodiment.
Figure 3B:
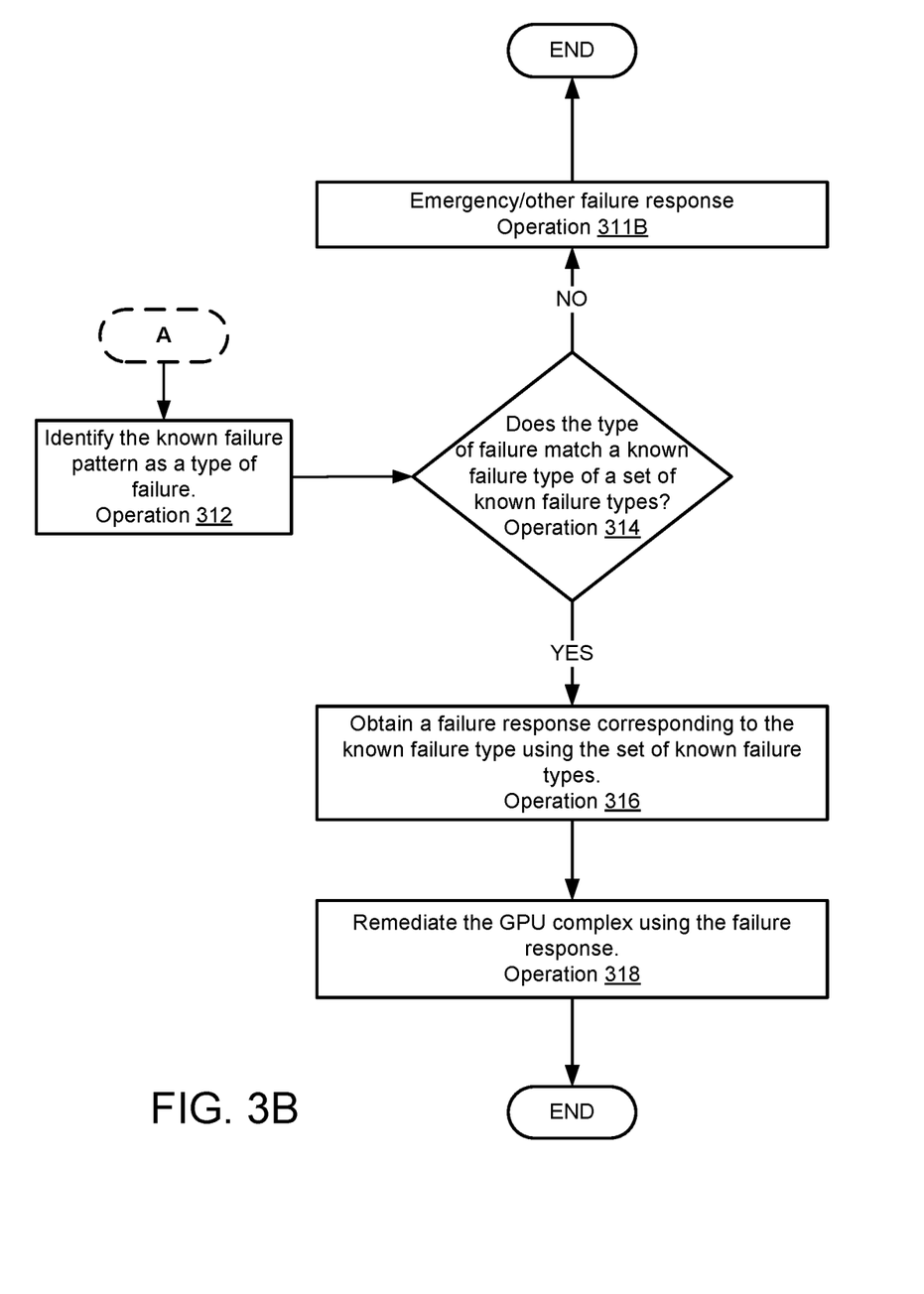

While performing their respective functionalities, management controller 108, pump manager 109, and/or data processing systems may perform all, or a portion, of the methods shown in FIGS. 3A-3B.

By customizing responses to different types of failures of LAAC systems, a system in accordance with embodiments disclosed herein may be more likely to (i) continue processing of workloads by GPUs (e.g., when failures do not imperil health of GPUs), (ii) preserve partially completed workloads hosted by GPUs that are subject to reduction in health if continued the GPUs continue to operate, and (iii) preserve health of GPUs at the expense of loss of partially completed workloads when health of the GPUs is imperiled.

While illustrated in FIG. 1A with a limited number of specific components, a system may include additional, fewer, and/or different components without departing from embodiments disclosed herein.

Figure 1B:
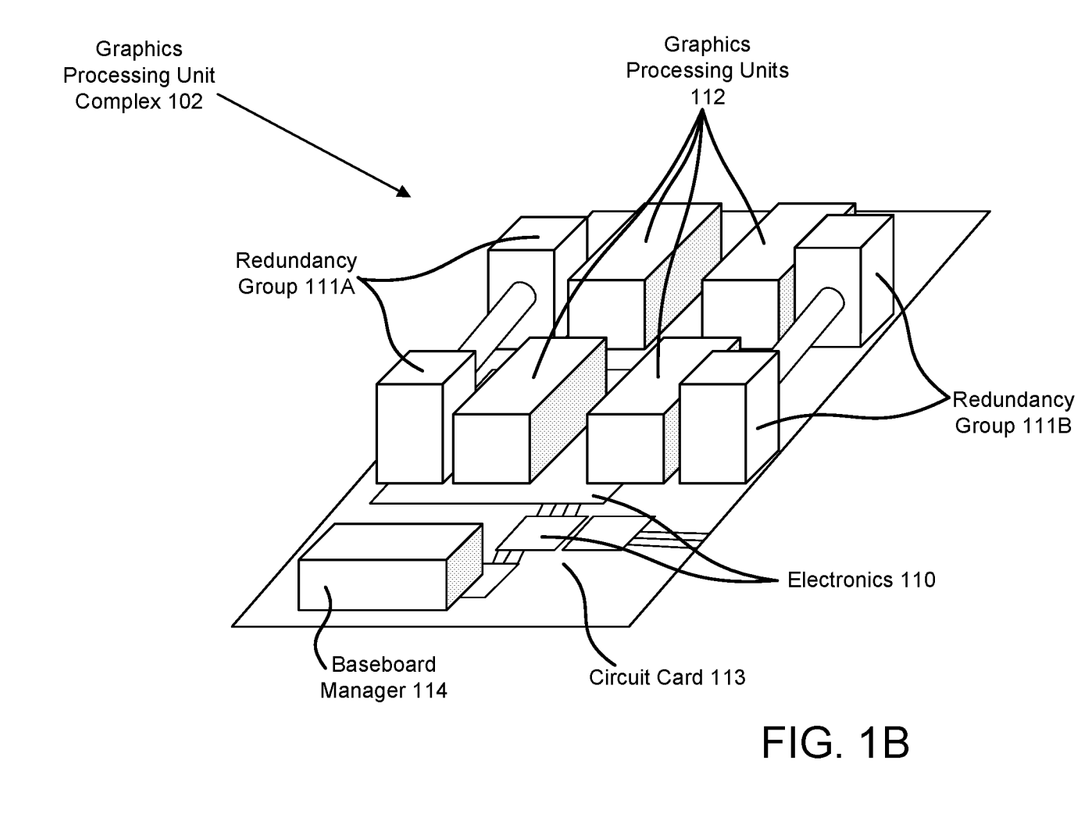
FIG. 1B shows a diagram illustrating a graphics processing units complex in accordance with an embodiment.

Turning to FIG. 1B, a diagram illustrating GPU complex 102 in accordance with an embodiment is shown. As discussed above, the system of FIG. 1A may provide computer-implemented services. To provide the computer-implemented services, the system may include GPU complex 102.

GPU complex 102 may include functionality to provide various types of computer-implemented services. The computer-implemented services may include any number and type of computer-implemented services. Computer-implemented services may include, for example, database services, data processing services, electronic communication services, and/or any other services that may be provided using one or more computing devices. Other types of computer-implemented services may be provided by GPU complex 102 without departing from embodiments disclosed herein.

To provide the computer-implemented services, GPU complex 102 may include multi-core processors such as graphics processing units (GPUs) 112. GPU 112 may include processing units capable of processing workloads in order to provide the computer-implemented services. To process the workloads, GPU 112 may be configured to execute instructions for performing the operations discussed herein.

To provide the computer-implemented services, GPU complex 102 may further include various components such as electronics 110 and redundancy group 111A-111B. Electronics 110 may include various types of hardware components such as processors (e.g., graphics processing units 112), memory modules, storage devices, communications devices, and/or other types of devices. Any of these hardware components may be operably connected to one another using circuit card traces, cabling, connectors, etc. (e.g., the GPUs of GPU 112 may be operably connected to one another using circuit card 113).

Redundancy group 111A-111B may include the pumps of the LAAC system, discussed previously. Redundancy group 111A-111B may thermally manage the hardware components (e.g., the GPUs) of GPU complex 102. The pumps of redundancy group 111A-111B may thermally manage the hardware components by being positioned with corresponding hardware components. For example, a pump may be positioned with a GPU (a corresponding hardware component) in order to be in thermal communication with the GPU. Doing so may allow the pump to facilitate the transfer of heat away from the hardware component.

Although illustrated with a specific number of components, GPU complex 102 may have any number of redundancy groups, and each redundancy group may have any number of pumps connected in series. Pumps connected in series may be connected to radiator 104, as discussed with respect to FIG. 1A. By being connected in series, pumps sharing a same redundancy group of the redundancy groups may provide a redundancy failsafe (e.g., if a first pump in a redundancy group fails then a second pump in the redundancy group may become a backup to the first pump).

However, as discussed with respect to FIG. 1A, failure of one or more of the pumps may place undesired levels of physical stress on GPU 112, and/or may result in other undesirable impacts to the functionality of the GPUs. For example, the failure may cause damage to the GPUs by allowing the GPUs to overheat. Consequently, damage to the GPUs may lead to workload loss, thereby delaying the system of FIG. 1A from providing the computer-implemented services.

To further improve the likelihood of preserving the workloads, GPU complex 102 may include baseboard manager 114. Baseboard manager 114 may be implemented by an integrated circuit such as a field-programmable gate array (FPGA). Baseboard manager 114 may be adapted to instruct the GPUs based on instructions baseboard manager 114 obtains from management controller 108 in FIG. 1A. By doing so, management controller 108 may manage operations of the GPU complex 102 to preserve the workloads.

While illustrated in FIG. 1B with a limited number of specific components, a system may include additional, fewer, and/or different components without departing from embodiments disclosed herein.

Figure 2A:
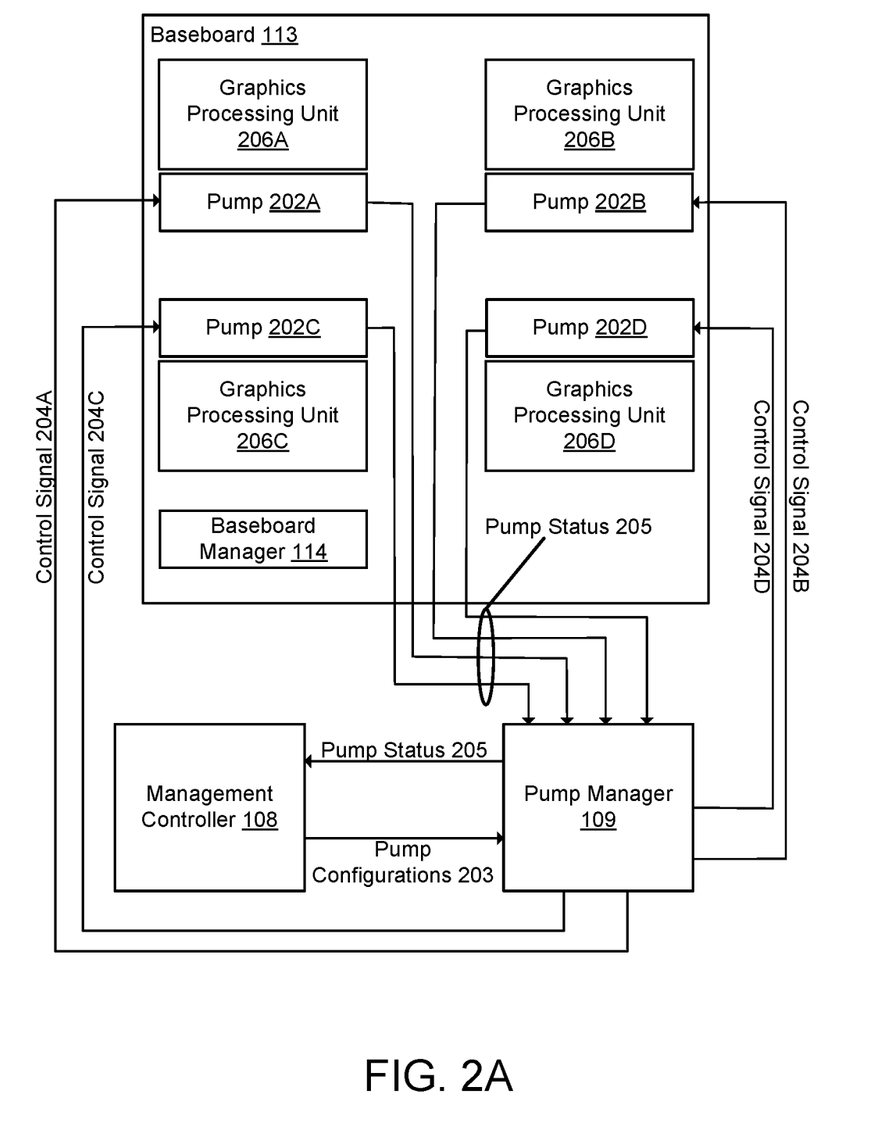
FIG. 2A-2C show diagrams illustrating data structures and interactions between system components in accordance with an embodiment.

Turning to FIG. 2A, a data flow diagram illustrating management of a pump manager overtime in accordance with an embodiment is shown. As previously discussed, pump manager 109 may be adapted to directly communicate with the pumps of the LAAC system (e.g., pump 202A-202D), relaying instructions from management controller 108, and interpreting data from the pumps to transmit to management controller 108.

To do so, management controller 108 may obtain known good configuration data that specifies a range of acceptable operating conditions for the pumps. This known good configuration data may be implemented onto the pumps as pump configurations 203. Management controller 108 may transmit pump configurations 203 to pump manager 109 in order for pump manager 109 to relay pump configurations 203 to pump 202A-202D.

Pump manager 109 may interpret pump configurations 203 for pump 202A-202D and may then transmit pump configurations 203 as individual transmissions (e.g., control signal 204A-204D) to each pump.

Overtime, as graphics processing unit 206A-206D are operating, pump 202A-202D may periodically self-report actual operating conditions of the pumps (e.g., pump status 205) to pump manager 109. Pump manager 109 may interpret pump status 205 and transmit pump status 205 to management controller 108. If the actual operating conditions are outside the range specified by the known good configuration data, management controller 108 may identify a failure of the graphics processing unit complex. By doing so, management controller 108 may take proactive action against the failure (e.g., initiate an automatic failure response, discussed with respect to FIGS. 3A-3B).

While illustrated in FIG. 2A with a limited number of specific components, a system may include additional, fewer, and/or different components without departing from embodiments disclosed herein.

Figure 2B:
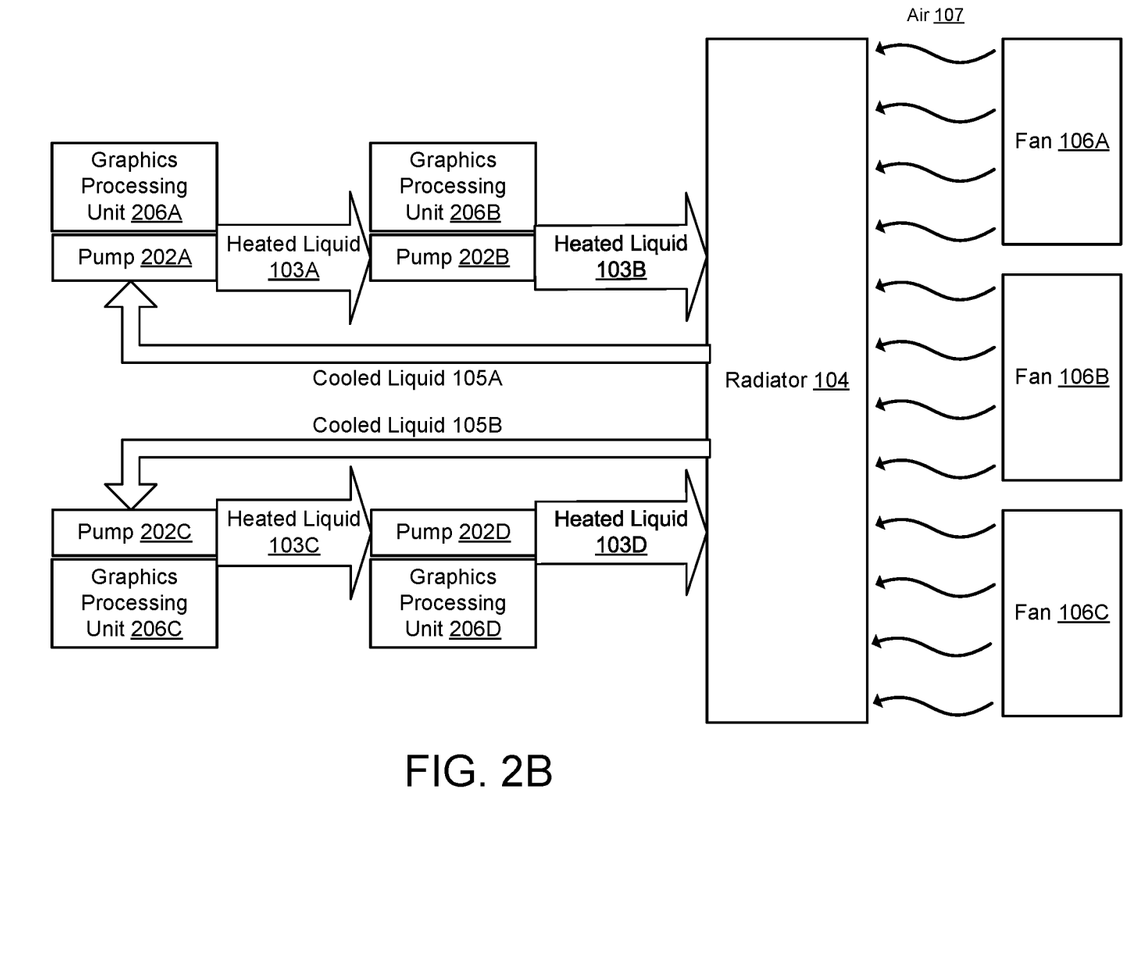

Turning to FIG. 2B, a data flow diagram illustrating data structures and interactions between system components in accordance with an embodiment is shown. As previously discussed, management controller 108 may obtain the known good configuration data that specifies a range of acceptable operating conditions for the pumps. This known good configuration data may be implemented onto the pumps as pump configurations. Management controller 108 may transmit the pump configurations to pump manager 109 in order for pump manager 109 to relay the pump configurations to pump 202A-202D.

Pump manager 109 may interpret the pump configurations for pump 202A-202D and may then transmit the pump configurations as individual transmissions to each pump.

Once obtained by pumps 202A-202C, the individual transmissions may cause pumps 202A-202C to prioritize operating as specified by the known good configuration data. The known good configuration data may further include topology information concerning the redundancy groups (e.g., how many redundancy groups, how many pumps in each redundancy group, which pumps are in series with one another and/or in what order are the pumps in series).

For example, as illustrated in FIG. 2B, the known good configuration data may specify four pumps (pump 202A-202D) grouped into two redundancy groups. A first redundancy group of the two redundancy groups may include pump 202A-202B, while a second redundancy group of the two redundancy groups may include 202C-202D.

The known good configuration data may further specify which, if any, pump is positioned with which graphics processing unit (out of graphics processing unit 202A-202D). For example, as illustrated in FIG. 2B, the known good configuration data may specify pump 202A-202B positioned with graphics processing unit (GPU) 206A-206B, respectively, and pump 202C-202D positioned with GPU 206C-206D, respectively.

As discussed previously with respect to FIG. 1, during processing of the workloads, each pump of pump 202A-202D may facilitate the transfer of heat away from corresponding GPUs using the cooling liquid.

Due to the topology including two redundancy groups, the loop that the cooling liquid traverses (e.g., thereby transitioning between heated liquid 103 and cooled liquid 105) may be divided into a first cooling liquid (e.g., 105A) and a second cooling liquid (e.g., 105B). The first cooling liquid may run through the first redundancy group while the second cooling liquid may run through the second redundancy group.

Looking at the first redundancy group, pump 202A may allow the first cooling liquid to carry the heat (becoming heated liquid 103A) before pushing the first cooling liquid through tubes that lead to pump 202B. Pump 202B may allow the first cooling liquid to carry the heat (becoming heated liquid 103B) before pushing the first cooling liquid through tubes that lead to radiator 104. Radiator 104 may allow for fans 106A-106C to blow air 107 onto radiator 104, cooling heated liquid 103B, and allowing the cooling liquid to return to the pumps as cooled liquid 105A.

Looking at the second redundancy group, pump 202C may allow the second cooling liquid to carry the heat (becoming heated liquid 103C) before pushing the second cooling liquid through tubes that lead to pump 202D. Pump 202D may allow the second cooling liquid to carry the heat (becoming heated liquid 103D) before pushing the second cooling liquid through tubes that lead to radiator 104. Radiator 104 may allow for fans 106A-106C to blow air 107 onto radiator 104, cooling heated liquid 103D, and allowing the cooling liquid to return to the pumps as cooled liquid 105B.

Although described as prioritizing operating as specified by the known good configuration data, the pumps (e.g., pumps 202A-202D) may not always operate as specified by the known good configuration data. If the actual operating conditions are outside the range specified by the known good configuration data, management controller 108 may identify a type of failure of the graphics processing unit complex.

A failure of the graphics processing unit complex may lead management controller 108 to execute an automatic failure response (to be discussed further with respect to FIGS. 3A-3B). An example of a failure response of many possible failure responses is discussed with respect to FIG. 2C.

While illustrated in FIG. 2B with a limited number of specific components, a system may include additional, fewer, and/or different components without departing from embodiments disclosed herein.

Figure 2C:
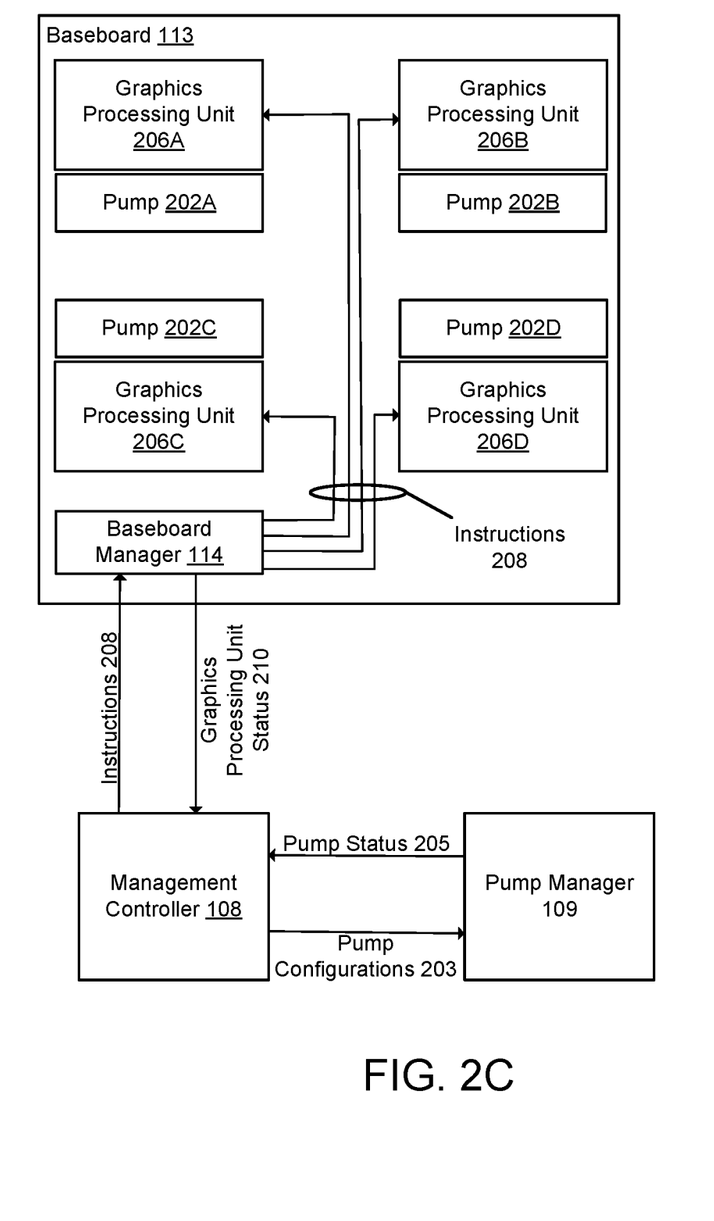

Turning to FIG. 2C, a data flow diagram illustrating management of a baseboard manager overtime in accordance with an embodiment is shown. As previously discussed, a failure of the graphics processing unit complex may lead management controller 108 to execute an automatic failure response.

Overtime, as pump status 205 is obtained by management controller 108, management controller 108 may determine instructions 208 to transmit to baseboard manager 114 as either the failure response (in an instance in which there is a failure of the GPU complex), or to change the operation of the GPUs 206A-206D in order to form and/or maintain operable conditions of the GPU complex. Instructions 208 may include, but is not limited to, for example, commands for GPUs 206A-206B to execute the automatic failure response.

As also previously discussed, for example, baseboard manager 114 may be adapted to instruct the GPUs based on instructions baseboard manager 114 obtains from management controller 108 in FIG. 1A. In other words, the baseboard manager 114 may relay instructions 208 from management controller 108 and interpret data for the GPUs 206A-206D as graphics processing unit (GPU) status 210 to transmit to management controller 108. GPU status 210 may include, but is not limited to, actual operating condition of the GPUs 206A-206D used to verify instructions 208 is carried out by GPUs 206A-206D. By doing so, management controller 108 may verify the effectiveness of the failure response and/or management of the GPU complex of the GPU complex 102 to preserve the workloads.

While illustrated in FIG. 2C with a limited number of specific components, a system may include additional, fewer, and/or different components without departing from embodiments disclosed herein.

As discussed above, various components of the system of FIG. 1 may perform various methods for managing a data processing system and more specifically to preserve, when possible workloads performed by GPUs during LAAC system failures. FIGS. 3A-3B show a method that may be performed to preserve workloads that are processed to provide computer-implemented services during a failure of the system. While FIGS. 3A-3B are illustrated with operations in a specific order, the operations may be performed in different orders, any of the operations may be omitted, additional operations (not shown) may be performed, and/or any of the operations may be performed in a parallel or partially overlapping in time manner with respect to other operations.

Turning to FIG. 3A, a first portion of two portions of a flow diagram illustrating a method for managing a data processing system (e.g., a GPU complex) in accordance with an embodiment is shown. The method illustrated in FIGS. 3A-3B may be performed, for example, by a management controller (e.g., management controller 108 in FIGS. 1A-2C) and/or other components of the system of FIG. 1.

At operation 302, known good configuration data is transmitted to a pump manager of the GPU complex. The known good configuration data may be transmitted by storing it at an address in storage that is accessible to the pump manager and/or the GPU complex, by sending a copy of the known good configuration to the pump manager via a communication link, and/or via other methods. For example, the known good configuration data may be transmitted during start-up of the GPU complex in order to configure the pumps managed by the pump manager to prepare the pumps for operation of the GPU complex. In some embodiments, the known good configuration data may be obtained from storage periodically to reconfigure the pumps overtime.

As previously discussed, the known good configuration data may include a range of acceptable operating conditions for the pumps that allow for the formation and/or maintenance of operable conditions for the pumps (refer FIGS. 2A-2C for more detail about the known good configuration data).

At operation 304, actual operating conditions from the pump manager are obtained. The actual operating conditions may be obtained by receiving the actual operating conditions from the pump manager. The actual operating conditions may be originally self-reported to the pump manager by the pumps.

At operation 306, a first determination is made regarding whether the actual operating conditions are with the range specified by the known good configuration data. The first determination may be made by comparing values included in the known good configuration data with the other values included in the actual operating conditions.

If the values included in the actual operating conditions are not within the range of values specified by the known good configuration data, then a failure of the GPU complex may be identified.

If the failure of the GPU complex is identified, then it may be determined that a failure response may be needed to preserve workloads being processing during the failure, and the method may proceed to operation 308 following operation 306. Otherwise, the method may proceed to operation 304 following operation 306 (looping through operation 304 until the failure is identified).

At operation 308, a failure pattern is generated based on the actual operating conditions. The generated failure pattern may be generated by, for example, using an algorithm to make the actual operating conditions fit into a pattern that is easily interpretable. For example, the generated failure pattern may be implemented using a binary sequence corresponding to the pumps. Each bit in the binary sequence may correspond to one of the pumps. The value of the bit may correspond to whether the pump is operable. The resulting bit pattern may then indicate whether (i) any of the pumps are inoperable, and (ii) whether all of the pumps in each redundancy group are inoperable. As will be discussed below, the responses to each of these different conditions may be different. Accordingly, this representation of the status of each of the pumps and corresponding redundancy groups may allow the system to efficiently respond to different types of inoperability's of pumps.

At operation 310, a second determination is made regarding whether the generated failure pattern matches at least one known failure pattern of a set of known failure patterns. The second determination may be made by first obtaining the set of know failure patterns from an address in storage accessible to the GPU complex. The generated failure pattern may then be compared to each known failure pattern included in the set of known failure patterns.

If the generated failure pattern does not match at least one known failure pattern of the set of known failure patterns, then the method may proceed to operation 311A. Otherwise, if the generated failure pattern does match at least one known failure pattern of the set of known failure patterns, then the method may proceed to block A.

At operation 311A, an alternative failure response is executed. The alternative failure response may be executed by (i) obtaining several alternative failure responses from storage, (ii) requesting input from a user of the GPU complex to initiate a desired course of action, (iii) switching the workloads endangered by the failure to other hardware components in order to continue processing the workloads with minimal risk of workload loss, (iv) shutting down the hardware components endangered by the failure and/or the GPU complex, and/or (v) any other action to preserve the workloads without identifying the specific reason for the failure occurring.

The method may end following operation 311A.

Returning to operation 310, the method may proceed to block A. Block A may be drawn with a dashed line to illustrate the continuation of the method of FIG. 3A in FIG. 3B.

Turning to FIG. 3B, a second portion of the two portions (connected by block A) of the flow diagram illustrating the method for managing a data processing system (e.g., the GPU complex) in accordance with an embodiment is shown. As previously mentioned, the method illustrated in FIGS. 3A-3B may be performed, for example, by a management controller (e.g., management controller 108 in FIGS. 1A-2C and/or other components of the system of FIG. 1.

Following block A, the method may proceed to operation 312.

At operation 312, the known failure pattern is identified as a type of failure. The known failure pattern may be identified by labelling the known failure pattern as the type of failure occurring within the GPU complex through pattern matching (each matched pattern may have a corresponding label). For example, if the failure pattern is "1100", this pattern may be match to a label "first redundancy group failure". Each matched failure pattern may have a corresponding label.

At operation 314, a third determination is made regarding whether the type of failure matches a known failure type of a set of known failure types. The third determination may be made by first obtaining the set of know failure types from an address in storage accessible to the GPU complex. The type of failure may then be compared to each known failure type included in the set of known failure types.

If the type of failure does not match at least one known failure type of the set of known failure types, then the method may proceed to operation 311B. Otherwise, if the type of failure does match at least one known failure type of the set of known failure types, then the method may proceed to operation 316.

At operation 311B, a second alternative failure response is executed. The second alternative failure response may be executed, similar to operation 311A, by (i) obtaining several alternative failure responses from storage, (ii) requesting input from a user of the GPU complex to initiate a desired course of action, (iii) switching the workloads endangered by the failure to other hardware components in order to continue processing the workloads with minimal risk of workload loss, (iv) shutting down the hardware components endangered by the failure and/or the GPU complex, and/or (v) any other action to preserve the workloads without identifying the specific reason for the failure occurring.

The method may end following operation 311B.

Returning to operation 314, the method may proceed to operation 316.

At operation 316, a failure response corresponding to the known failure type is obtained using the set of known failure types. The failure response corresponding to the known failure type may be obtained by checking the known failure type's corresponding failure response from the set of know failure types.

At operation 318, the failure response is executed. The failure response may be executed, as described with respect to FIG. 2C, by transmitting instructions to the GPUs of the GPU complex. The instructions may indicate (i) to backup the workloads endangered by the failure of the GPU complex, (ii) to switch processing of the endangered workloads to other hardware components (e.g., other GPUs of the GPU complex) that are not endangered, and/or (iii) to implement other automatic failure responses to preserve the workloads. By doing so, the method for managing a data processing system may enhance the preservation of workloads during failure in order to provide computer-implemented services without delay.

For example, if only one of the pumps in a redundancy group fails, the system may only issue a warning. However, if all of the pumps in a redundancy group fails, then the GPUs managed by the redundancy groups may be shut down and the workloads hosted by the GPUs may be preserved (e.g., by storing them and/or the states of the GPUs in storage or transferring the workloads/states to other GPUs). In contrast, if all of the pumps of all of the redundancy groups fail, then all of the GPUs may be shut down and the workloads may be preserved through storage if possible.

If any workloads are to be preserved, the operation of the GPUs may be minimized during the preservation process. For example, performance of the workloads may be suspended to reduce heat generation by the GPUs.

Similarly, if only a portion of the pumps of a redundancy group become inoperable, the operation of one or more of the GPUs thermally managed by the redundancy group may be limited to reduce heat generation. The GPUs may be selected based on, for example, priority rankings for the workloads.

The method may end following operation 318.

While described with respect to failure (e.g., due to mechanical issues such as lack of power, motor failure, etc.), pumps may be treated as having failed for different reasons for being unable to perform their functionality. For example, if leaks are detected or other undesired situations with respect to the pumps are encountered that prevents the pumps from performing their functionalities, then the pumps may be treated as having failed. If the leaks are not so significant as to cause the pumps to be unable to provide their functionalities, then the pumps may be treated as being subject to other types of undesired operation. For example, different types of errors may be ascribed to the pumps.

Figure 4:
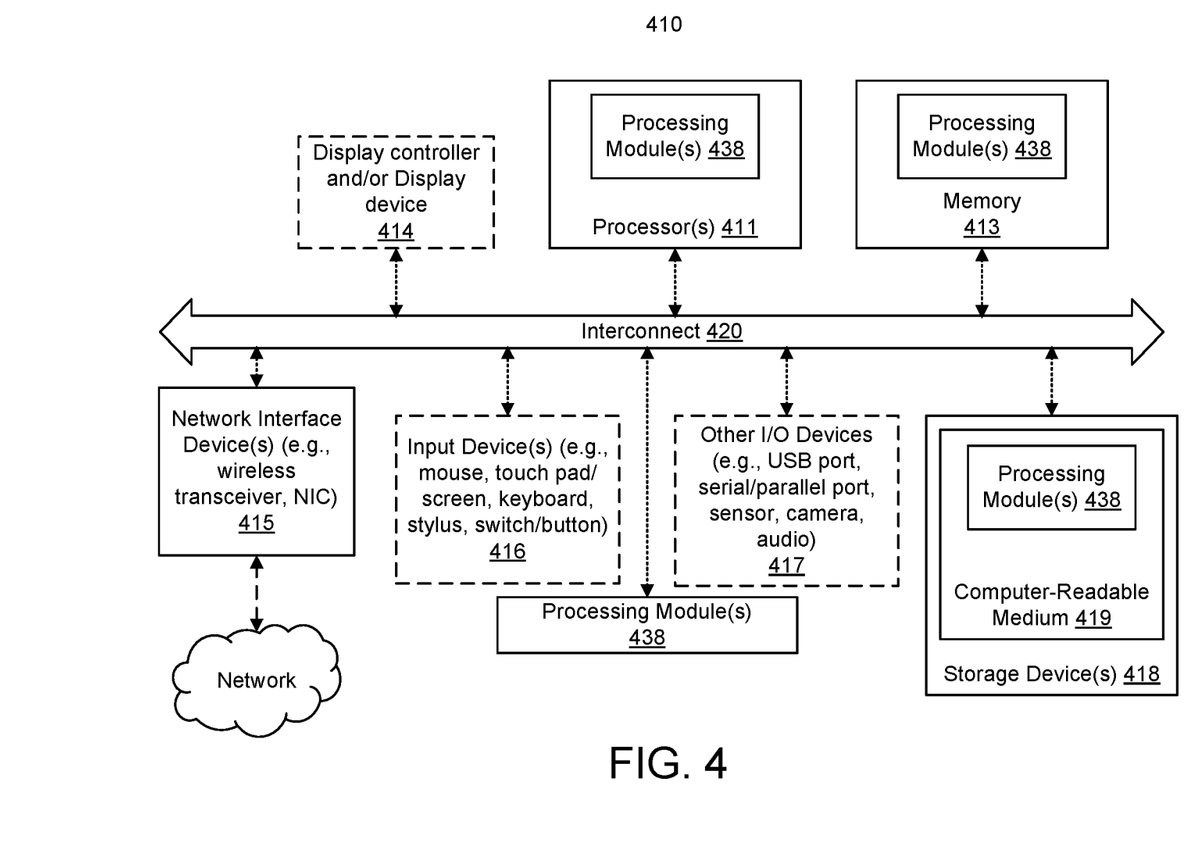
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 410 may represent any of data processing systems described above performing any of the processes or methods described above. System 410 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 410 is intended to show a high-level view of many components of the computer system. However, it is to be understood that additional components may be present in certain implementations and furthermore, different arrangement of the components shown may occur in other implementations. System 410 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 410 includes processor 411, memory 413, and devices 415-417 via a bus or an interconnect 420. Processor 411 may represent a single processor or multiple processors with a single processor core or multiple processor cores included therein. Processor 411 may represent one or more general-purpose processors such as a microprocessor, a central processing unit (CPU), or the like. More particularly, processor 411 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 411 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 411, which may be a low power multi-core processor socket such as an ultra-low voltage processor, may act as a main processing unit and central hub for communication with the various components of the system. Such processor can be implemented as a system on chip (SoC). Processor 411 is configured to execute instructions for performing the operations discussed herein. System 410 may further include a graphics interface that communicates with optional graphics subsystem 414, which may include a display controller, a graphics processor, and/or a display device.

Processor 411 may communicate with memory 413, which in one embodiment can be implemented via multiple memory devices to provide for a given amount of system memory. Memory 413 may include one or more volatile storage (or memory) devices such as random-access memory (RAM), dynamic RAM (DRAM), synchronous DRAM (SDRAM), static RAM (SRAM), or other types of storage devices. Memory 413 may store information including sequences of instructions that are executed by processor 411, or any other device. For example, executable code and/or data of a variety of operating systems, device drivers, firmware (e.g., input output basic system or BIOS), and/or applications can be loaded in memory 413 and executed by processor 411. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 410 may further include IO devices such as devices (e.g., 415, 415, 417, 418) including network interface device(s) 415, optional input device(s) 415, and other optional IO device(s) 417. Network interface device(s) 415 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 415 may include a mouse, a touch pad, a touch sensitive screen (which may be integrated with a display device of optional graphics subsystem 414), a pointer device such as a stylus, and/or a keyboard (e.g., physical keyboard or a virtual keyboard displayed as part of a touch sensitive screen). For example, input device(s) 415 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 417 may include an audio device. An audio device may include a speaker and/or a microphone to facilitate voice-enabled functions, such as voice recognition, voice replication, digital recording, and/or telephony functions. Other IO devices 417 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 417 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 420 via a data collector hub (not shown), while other devices such as a keyboard or thermal data collector may be controlled by an embedded controller (not shown), dependent upon the specific configuration or design of system 410.

To provide for persistent storage of information such as data, applications, one or more operating systems and so forth, a mass storage (not shown) may also couple to processor 411. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 411, e.g., via a serial peripheral interface (SPI). This flash device may provide for non-volatile storage of system software, including a basic input/output software (BIOS) as well as other firmware of the system.

Storage device 418 may include computer-readable storage medium 419 (also known as a machine-readable storage medium or a computer-readable medium) on which is stored one or more sets of instructions or software (e.g., processing module, unit, and/or processing module/unit/logic 438) embodying any one or more of the methodologies or functions described herein. Processing module/unit/logic 438 may represent any of the components described above. Processing module/unit/logic 438 may also reside, completely or at least partially, within memory 413 and/or within processor 411 during execution thereof by system 410, memory 413 and processor 411 also constituting machine-accessible storage media. Processing module/unit/logic 438 may further be transmitted or received over a network via network interface device(s) 415.

Computer-readable storage medium 419 may also be used to store some software functionalities described above persistently. While computer-readable storage medium 419 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 438, components and other features described herein can be implemented as discrete hardware components or integrated in the functionality of hardware components such as ASICS, FPGAs, DSPs or similar devices. In addition, processing module/unit/logic 438 can be implemented as firmware or functional circuitry within hardware devices. Further, processing module/unit/logic 438 can be implemented in any combination hardware devices and software components.

Note that while system 410 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system for providing computer-implemented services using, at least in part, a graphics processing unit complex comprising graphics processors and pumps used to thermally manage the graphics processors, comprising:
   a processor; and
   a management controller that is programmed to:
      make a first determination regarding whether actual operating conditions for the graphics processing unit complex are within a range of known good configuration data, the actual operation conditions being based on operation of the pumps;
      in an instance of the first determination where the actual operating conditions are not within the range:
         obtain a failure pattern based on the actual operating conditions;
         make a second determination regarding whether the failure pattern matches a known failure pattern;
         in an instance of the second determination where the failure pattern matches the known failure pattern:
            obtain a type of failure for the known failure pattern;
            make a third determination regarding whether the type of failure matches a known failure type;
            in an instance of the third determination where the failure type matches the known failure type:
               obtain a failure response corresponding to the known failure type; and
               performing a remediation for the graphics processing unit complex using the failure response.

2. The data processing system of claim 1, wherein the operation of the pumps is based, at least in part, on at least one selected from a group consisting of:
   flow rates of cooling fluid through the pumps;
   temperatures of the pumps;
   pressure of the cooling fluid through the pumps; and
   leaking of the cooling fluid from the graphics processing unit complex.

3. The data processing system of claim 2, wherein the known good configuration data defines a range of operating conditions that are likely to result in successful operation of the graphics processing unit complex.

4. The data processing system of claim 1, wherein the known failure pattern indicates:
   a failure of a first pump of the pumps that is a member of a first redundancy group and continued operation of a second pump of the pumps that is a member of the first redundancy group.

5. The data processing system of claim 4, wherein the known failure pattern indicates:
   a failure of all of the pumps that are members of a second redundancy group.

6. The data processing system of claim 5, wherein the first redundancy group comprises any number of the pumps, all of any number of pumps being in serial fluid communication with one another, and the any number of pumps forming a cooling loop in line with a thermal dissipation element.

7. The data processing system of 1, wherein performing the remediation for the graphics processing unit complex using the failure response comprises:
   migrating a workload hosted by a first graphics processing unit of the graphics processing unit complex to a different graphics processing unit.

8. The data processing system of 7, wherein performing the remediation for the graphics processing unit complex using the failure response further comprises:
   backing up a workload hosted by a first graphics processing unit of the graphics processing unit complex to a different graphics processing unit.

9. The data processing system of 8, wherein performing the remediation for the graphics processing unit complex using the failure response further comprises:
   notifying a user of the data processing system that a workload hosted by a graphics processing unit of the graphics processing unit complex is at higher risk of completion failure.

10. The data processing system of 9, wherein performing the remediation for the graphics processing unit complex using the failure response further comprises:
    modifying a pumping rate of cooling fluid by the graphics processing unit.

11. A non-transitory machine-readable medium having instructions stored therein, which when executed by a processor, cause the processor to perform operations for providing computer-implemented services using, at least in part, a graphics processing unit complex comprising graphics processors and pumps used to thermally manage the graphics processors, the operations comprising:

making, by a management controller, a first determination regarding whether actual operating conditions for the graphics processing unit complex are within a range of known good configuration data, the actual operation conditions being based on operation of the pumps;

in an instance of the first determination where the actual operating conditions are not within the range:
obtaining, by the management controller, a failure pattern based on the actual operating conditions;
making, by the management controller, a second determination regarding whether the failure pattern matches a known failure pattern;
in an instance of the second determination where the failure pattern matches the known failure pattern:
obtaining, by the management controller, a type of failure for the known failure pattern;
making, by the management controller, a third determination regarding whether the type of failure matches a known failure type;
in an instance of the third determination where the failure type matches the known failure type:
obtaining, by the management controller, a failure response corresponding to the known failure type; and
performing, by the management controller, a remediation for the graphics processing unit complex using the failure response.

12. The non-transitory machine-readable medium of claim 11, wherein the operation of the pumps is based, at least in part, on at least one selected from a group consisting of:
flow rates of cooling fluid through the pumps;
temperatures of the pumps;
pressure of the cooling fluid through the pumps; and
leaking of the cooling fluid from the graphics processing unit complex.

13. The non-transitory machine-readable medium of claim 12, wherein the known good configuration data defines a range of operation conditions that are likely to result in successful operation of the graphics processing unit complex.

14. The non-transitory machine-readable medium of claim 11, wherein the known failure pattern indicates:
a failure of a first pump of the pumps that is a member of a first redundancy group and continued operation of a second pump of the pumps that is a member of the first redundancy group.

15. The non-transitory machine-readable medium of claim 14, wherein the known failure pattern indicates:
a failure of all of the pumps that are members of a second redundancy group.

16. A management controller, comprising:
a processor; and
a memory coupled to the processor to store instructions, which when executed by the processor, cause the processor to perform operations for providing computer-implemented services using, at least in part, a graphics processing unit complex comprising graphics processors and pumps used to thermally manage the graphics processors, the operations comprising:

making a first determination regarding whether actual operating conditions for the graphics processing unit complex are within a range of known good configuration data, the actual operation conditions being based on operation of the pumps;

in an instance of the first determination where the actual operating conditions are not within the range:
obtaining a failure pattern based on the actual operating conditions;
making a second determination regarding whether the failure pattern matches a known failure pattern;
in an instance of the second determination where the failure pattern matches the known failure pattern:
obtaining a type of failure for the known failure pattern;
making a third determination regarding whether the type of failure matches a known failure type;
in an instance of the third determination where the failure type matches the known failure type:
obtaining a failure response corresponding to the known failure type; and
performing a remediation for the graphics processing unit complex using the failure response.

17. The management controller of claim 16, wherein the operation of the pumps is based, at least in part, on at least one selected from a group consisting of:
flow rates of cooling fluid through the pumps;
temperatures of the pumps;
pressure of the cooling fluid through the pumps; and
leaking of the cooling fluid from the graphics processing unit complex.

18. The management controller of claim 17, wherein the known good configuration data defines a range of operation conditions that are likely to result in successful operation of the graphics processing unit complex.

19. The management controller of claim 16, wherein the known failure pattern indicates:
a failure of a first pump of the pumps that is a member of a first redundancy group and continued operation of a second pump of the pumps that is a member of the first redundancy group.

20. The management controller of claim 19, wherein the known failure pattern indicates:
a failure of all of the pumps that are members of a second redundancy group.

* * * * *